(12) United States Patent
Stering

(10) Patent No.: US 9,664,585 B2
(45) Date of Patent: May 30, 2017

(54) METHOD AND DEVICE FOR VERIFICATION AND/OR CALIBRATION OF A PRESSURE SENSOR

(71) Applicant: Sartorius Stedim Biotech GmbH, Goettingen (DE)

(72) Inventor: Magnus Stering, Le mesnil le roi (FR)

(73) Assignee: Sartorius Stedium Biotech GmbH (DE)

( * ) Notice: Subject to any disclaimer, the term of this patent is extended or adjusted under 35 U.S.C. 154(b) by 248 days.

(21) Appl. No.: 14/428,424

(22) PCT Filed: Sep. 13, 2013

(86) PCT No.: PCT/EP2013/002772
§ 371 (c)(1),
(2) Date: Mar. 16, 2015

(87) PCT Pub. No.: WO2014/063767
PCT Pub. Date: May 1, 2014

(65) Prior Publication Data
US 2015/0226628 A1    Aug. 13, 2015

(51) Int. Cl.
*G01L 27/00*    (2006.01)
(52) U.S. Cl.
CPC .......... *G01L 27/005* (2013.01); *G01L 27/002* (2013.01)
(58) Field of Classification Search
CPC ... G01L 27/005; G01L 27/002; G01L 27/007; G01L 27/02; G01L 25/00; G01L 25/003;
(Continued)

(56) References Cited

U.S. PATENT DOCUMENTS 6,652,243 B2 * 11/2003 Krasnov ................... F04F 1/06
                                                                 417/101
6,782,753 B1    8/2004 Immer et al.
(Continued)

OTHER PUBLICATIONS

Translation International Preliminary Report on Patentability and Written Opinion.
(Continued)

*Primary Examiner* — Eric S McCall
*Assistant Examiner* — Mohammed E Keramet-Amircola
(74) *Attorney, Agent, or Firm* — Gerald E. Hespos; Michael J. Porco; Matthew T. Hespos

(57) ABSTRACT

A method for calibrating a pressure sensor includes connecting the pressure sensor to first and second fluid storage vessels; providing an initial fluid pressure at the pressure sensor and at the fluid storage vessels; and carrying out a pressure measurement of the initial fluid pressure at a time $t_0$. The method then disconnects the second fluid storage vessel from the pressure sensor and the first fluid storage vessel; provides a first fluid pressure at the second fluid storage vessel; and carries out a pressure measurement of the first fluid pressure at a time $t_1$. The method then connects the second fluid storage vessel with the pressure sensor and the first fluid storage vessel, so that a second fluid pressure between the initial and first fluid pressures is provided at the pressure sensor; and carries out a pressure measurement of the second fluid pressure at a time $t_2$.

15 Claims, 16 Drawing Sheets

(58) Field of Classification Search
CPC .... G01L 25/006; G01L 27/00; B01F 15/0085; B01F 15/00831; C12M 23/26; C12M 27/02; C12M 23/14
USPC ........................................ 73/1.63, 49.2, 49.3
See application file for complete search history.

(56) References Cited

U.S. PATENT DOCUMENTS

| | | | |
|---|---|---|---|
| 9,113,818 B2* | 8/2015 | Brunner | A61B 5/0876 |
| 2007/0108671 A1* | 5/2007 | Hong | G01L 27/005 266/78 |
| 2011/0076759 A1* | 3/2011 | Reif | C12M 21/04 435/297.1 |
| 2011/0265899 A1* | 11/2011 | Cruse | G01L 27/005 137/565.23 |
| 2012/0327145 A1* | 12/2012 | Pouzet | B41J 2/02 347/7 |
| 2012/0330168 A1* | 12/2012 | Pfeiffer | A61B 5/0215 600/488 |

OTHER PUBLICATIONS

International Search Report of Nov. 28, 2013.
Written Opinion of the International Searching Authority.

* cited by examiner

METHOD AND DEVICE FOR VERIFICATION AND/OR CALIBRATION OF A PRESSURE SENSOR

BACKGROUND

1. Field of the Invention

The invention relates to a method for verifying and/or calibrating a pressure sensor and a device for automatically carrying out the verification and/or calibration of the pressure sensor. The invention likewise relates to a computer program product for automatically carrying out the method.

2. Description of the Related Art

Various apparatuses for production or testing comprise one or more pressure sensor for reading the pressure of a fluid, such as a gas, a liquid or a mixture thereof, for example to control the pressure in a biochemical process container or to verify filter devices. Since the reading of the pressure sensor may be prone to some time drifts during use of the apparatuses, it is necessary to verify, whether the readings of the pressure sensor are reliable or whether the pressure sensor must be replaced by a new one.

In order to perform a verification of the pressure sensor it is required to compare the reading of the pressure sensor of the apparatus with a reading of a reference pressure sensor. However, high efforts of time and manpower are required to provide a reference sensor and perform the verification test. Thus, this procedure is not suitable to provide a continuous verification whether the pressure sensor is possibly affected by a time drift phenomenon.

It is a problem to provide a more quick and reliable test method and a corresponding test device to perform a verification or calibration test of the pressure sensor.

SUMMARY

One aspect of the invention relates to a method, preferably a microprocessor controlled method, for carrying out a calibration test on a pressure sensor the method comprising the steps:
  fluidly connecting the pressure sensor to a first fluid storage vessel;
  fluidly connecting the pressure sensor to a second fluid storage vessel;
  providing an initial fluid pressure $p_0$ at the pressure sensor, the first fluid storage vessel and the second fluid storage vessel;
  carrying out a pressure measurement of the initial fluid pressure $p_0$ at a time $t_0$ by means of the pressure sensor;
  fluidly disconnecting the second fluid storage vessel from the pressure sensor and the first fluid storage vessel;
  providing a first fluid pressure $p_1$ at the second fluid storage vessel;
  carrying out a pressure measurement of the first fluid pressure $p_1$ at a time $t_1$ by means of the pressure sensor;
  fluidly connecting the second fluid storage vessel with the pressure sensor and the first fluid storage vessel, so that a second fluid pressure $p_2$ is provided at the pressure sensor, wherein the second fluid pressure is between the initial fluid pressure $p_0$ and the first fluid pressure $p_1$;
  carrying out a pressure measurement of the second fluid pressure $p_2$ at a time $t_2$ by means of the pressure sensor.

The method can be carried by means of a microprocessor or computer controlling appropriate means for connecting or disconnecting fluid connections between the different elements, such as the first and second fluid storage vessels. Therefore, the result of the method is reproducable.

The term pressure sensor describes all means, which are capable to measure a hydrostatic or pneumatic pressure or a force applied to the sensor. The pressure sensor may use the piezo-electric effect, the measurement of strain or stress of an elastic material or other parameter which vary under the influence of the pressure.

The first and second fluid storage vessels can be any fluid tight container connectable to the pressure sensor in a fluid tight manner. However, it is preferred that the vessels have a constant volume also under pressure conditions, such as pressures of greater than about 200 kPa, preferrably greater than about 500 kPa. It is further desirable that the vessels are chemically and physically inert with respect to the fluid to be stored in the vessels. Thus, the vessels may be made of stainless steel, polymers or glass.

The providing of the initial fluid pressure $p_0$ can be performed by a fluid source to provide an initial pressure higher than the atmosphere pressure, a fluid drain to provide an initial pressure lower than the atmosphere pressure or simply by a fluid connection to the atmosphere in order to provide an initial pressure, which is equal to the atmosphere pressure.

The readings or results of the pressure measurements can be stored together with the belonging time of the measurement in order to keep proper records of the verification or calibration. Furthermore, it can be enforced that the measurement of the first pressure $p_1$ is performed after a sufficient stabilization time $t_1-t_0$ has been passed by. Correspondingly, the stabilization time $t_2-t_1$ might be equal to the stabilization time $t_1-t_0$.

This stabilization time might be long enough to establish equilibrium conditions with respect to pressure and/or fluid temperature in all volumes fluidly connected to the pressure sensor. Thus, the stabilization time might be longer than 1 second, preferably longer than 10 second, and even more preferably longer than 30 seconds. In order to reduce the overall time of testing the stabilization time might be less than 5 minutes and preferably less than 2 minutes.

The measurements of the pressures $p_0$, $p_1$, and $p_2$ can be used for a verification or calibration of the pressure sensor without a calibrated reference pressure sensor. Therefore, there is no need to keep a reference pressure sensor calibrated in a stand-by condition, in case the pressure sensor has to be verified.

The calibration of the pressure sensor is exact, since the differences between the measured pressures $p_0$, $p_1$, and $p_2$ are only dependent on the volumes of the vessels and the volume of the fluid connection or fluid lines connecting the vessels and the pressure sensor. These volumes can be determined with a high precision and, thus, the verification or calibration is reliable.

The relation between the volumes and the pressure is given by the ideal gas law under the assumption that the fluid within the volumes can be treated as an ideal gas. The ideal gas law can be written as:

$$pV/T = nR = \text{constant.} \qquad (1)$$

Assuming that the volumes fluidly connected to the pressure sensor, such as the internal volumes of the vessels and the respective fluid connections, are fluid tight, the number of fluid molecules n remains constant. The parameter R is also a constant factor. In case the changes in temperature T during the testing procedure are insignificant, the ideal gas law can be simplified to read:

$$pV = \text{constant.} \qquad (2)$$

During the test method the system of the first and second vessels and the pressure sensor are transformed into a first condition, wherein the second vessel with a volume $V_2$ is under the initial pressure of $p_0$ and the first vessel having a volume $V_1$ is under the first pressure of $p_1$. In terms of the ideal gas law and neglecting the volumes of the connecting fluid lines, which can be insignificant small compared to the volumes of the first and second vessels or integrated in the value of each volume, the first condition of the test device can be written in term of the left side of equation (3) below:

$$p1V1+p0V2=\text{const.}=p2(V1+V2) \quad (3)$$

After fluidly connecting the first and second vessels, the pressure in these vessels becomes an intermediate second pressure p2 within an interval between the initial fluid pressure p0 and the first pressure p1, which can be exactly determined using the right side of equation (3) above. Thus, the three pressures (initial fluid pressure p0, first fluid pressure p1, and second fluid pressure p2) measured in the test method are related to each other by an exact relationship dependent on the given volumes of the vessels. Any mismatch of the measured pressures which is beyond an acceptable tolerance can be an indication that the pressure sensor does not provide reliable pressure readings and should, therefore, be replaced or calibrated by external means.

As an option, the method comprises the further step of:
determining the difference $\Delta p_2$ between the measured second fluid pressure $p_2$ and the predicted second fluid pressure $<p_2>$ predicted by means of above formula (2).

Under the assumption that the fluid in the storage vessels and the interconnecting fluid lines is an ideal gas and the changes in temperature during the test procedure are insignificant, the following equation (4) can be used to predict the second fluid pressure:

$$<p2>=(p1V1+p0V2)/(V1+V2), \quad (4)$$

with $p_0 \leq <p_2> \leq p_1$ and wherein $<p2>$ is the predicted fluid pressure belonging to the measured second fluid pressure p2 at the time t2, when the fluid pressure in the storage vessels is in an equilibrium.

In the special case that the volumes of the first and second storage vessels are identical, i.e. V1=V2, the predicted fluid pressure $<p2>$ is the mean value of the pressures p0 and p1, i.e. $<p2>=(p1+p0)/2$.

Optionally, the method comprises the further step of determining whether the difference $\Delta p_2$ is within a predefined limit $\epsilon$.

Particularly, it can be determined, whether the difference between the predicted and the measured value of the second fluid pressure is smaller than 1000 Pa (10 mbar) or smaller than 500 Pa (5 mbar). In case the difference is greater than the given acceptable value, a warning signal can be generated. The warning signal might be an acoustical and/or an optical signal to inform a user about the pressure sensor failing the verification test.

As an option, the method further comprises the steps of:
providing a third fluid storage vessel having a volume $V_3$ and being initially at the initial fluid pressure p0;
fluidly connecting the pressure sensor, the first fluid storage vessel and/or the second fluid storage vessel to the third fluid storage vessel, so that a third fluid pressure $p_3$ is provided at the pressure sensor, wherein the third fluid pressure $p_3$ is between the initial fluid pressure $p_0$ and the second fluid pressure $p_2$;
carrying out a pressure measurement of the third fluid pressure $p_3$ at a time $t_3$ by means of the pressure sensor.

In analogy to formula (4) the third fluid pressure $<p_3>$ can be predicted by the equation $$<p_3>=(p_2(V_1+V_2)+p_0V_3)/(V_1+V_2+V_3), \quad (5)$$

with $p_0 \leq p_3 \leq p_2$. The prediction is valid in case the fluid is an ideal gas and for a time $t_3$, when the fluid pressure in the storage vessels is in equilibrium.

Optionally, the method further comprises the steps of:
iteratively performing the following method steps subsequently for all natural numbers n being within the interval $4 \leq n \leq N$ and N being a natural number of maximum iterations:
providing a n-th fluid storage vessel having a volume $V_n$ and being initially at the initial fluid pressure $p_0$;
fluidly connecting the pressure sensor and the first to n-th fluid storage vessel to the n-th fluid storage vessel, so that a n-th fluid pressure is provided at the pressure sensor, wherein the n-th fluid pressure $p_n$ is between the initial fluid pressure $p_0$ and the (n−1)-th fluid pressure $p_{(n-1)}$;
carrying out a pressure measurement of the n-th fluid pressure $p_n$ at a time $t_0$ by means of the pressure sensor.

Correspondingly, the n-th fluid pressure $<p_n>$ can be predicted by the equation $$<p_n>=(p_0V_n+p_{(n-1)}\Sigma_{i=1}^{n-1}V_i)/\Sigma_{i=1}^{n}V_i \quad (6)$$

with $p_0 \leq p_n \leq p_{(n-1)}$. Again the prediction is valid in case the fluid is an ideal gas and for a time $t_n$, when the fluid pressure in the storage vessels is in equilibrium.

Particularly, a norm of the differences between the plurality of predicted and measured values $p_2$, $p_3$, $p_4$ and so on can be calculated, such as the L2-norm or the L1-Norm, particularly when considering the pressure measurements and predictions each as contained in a vector.

As an option, the method may comprise the steps of:
fluidly disconnecting the pressure sensor and the first fluid storage vessel from the second fluid storage vessel;
providing again the initial fluid pressure $p_0$ at the pressure sensor and the first fluid storage vessel;
fluidly connecting the second fluid storage vessel with the pressure sensor and the first fluid storage vessel, so that a third fluid pressure $p_3$ is provided at the pressure sensor, wherein the third fluid pressure $p_3$ is between the initial fluid pressure $p_0$ and the second fluid pressure $p_2$;
carrying out a pressure measurement of the third fluid pressure $p_3$ at a time $t_3$ by means of the pressure sensor (3).

Using this option the third pressure $p_3$ at time $t_3$ can be predicted using the equation below:

$$<p_3>=(p_2V_2+p_0V_1)/(V_1+V_2), \quad (7)$$

with $p_0 \leq p_3 \leq p_2$ and wherein $<p_3>$ is the predicted fluid pressure at a time $t_3$, when the fluid pressure in the storage vessels is in an equilibrium.

The above described steps can be reiterated in order to measure a fourth, fifth, sixth or subsequent fluid pressure and calculate the corresponding pressures. The verification, whether the pressure sensor is reliable, can be performed by calculating differences between single pairs of measured and predicted fluid pressures or using a norm, such as the L2-norm or the L1-Norm, applied to a plurality of corresponding pairs of measured and predicted fluid pressures.

Optionally, the method can comprise the calculation of a linear regression of the measured pressure values versus the predicted pressure values in order to determine a calibration function.

Linear regressions are well-known in data analysis. The linear regression results in a linear function of measurable fluid pressure values depending on the real fluid pressure. In case of a perfect match the regression coefficient will be 1.00. However, a regression coefficient lower than a predetermined value, for example 0.95 or 0.9, might indicate that the linear regressions will not work properly. In this case, a warning might be generated that the pressure sensor is not reliable.

Another aspect of the invention relates to a test device for automatically carrying out a calibration test on a pressure sensor, the test apparatus comprising:
a fluid line which is fluidly connected to the pressure sensor to be tested via a pressure sensor valve;
a first fluid connector configured to fluidly connecting a first fluid storage vessel to the fluid line;
a vessel valve configured to fluidly connect or disconnect the second fluid connector from the pressure sensor;
a fluid outlet configured to release fluid from the fluid line via an outlet valve;
a fluid inlet configured to fluidly connecting a fluid source to the fluid line via an inlet valve;
a control unit configured to perform automatically the following control steps:
closing the inlet valve;
opening the vessel valve to fluidly connect the pressure sensor to the second fluid connector;
opening the outlet valve to provide atmosphere pressure at the pressure sensor, the first fluid connector and the second fluid connector;
performing a pressure measurement of the atmosphere pressure as the initial fluid pressure $p_0$ at a time $t_0$ by means of the pressure sensor;
closing the outlet valve and the vessel valve;
opening the inlet valve and providing a fluid having a first fluid pressure $p_1$ at the first fluid connector and the pressure sensor;
closing the inlet valve;
carrying out a pressure measurement of the first fluid pressure $p_1$ at a time $t_1$ by means of the pressure sensor;
opening the vessel valve in order to fluidly connecting the second fluid connector with the pressure sensor and the first fluid connector, so that a second fluid pressure $p_2$ is provided at the pressure sensor;
carrying out a pressure measurement of the second fluid pressure $p_2$ at a time $t_2$ by means of the pressure sensor.

Preferably, the test device further comprises:
a first fluid storage vessel fluidly connected to the first fluid connector and/or
a second fluid storage vessel fluidly connected to the second fluid connector.

Preferably, the test device further comprises:
calculation means, which are configured to determine the difference $\Box p_2$ between the measured second fluid pressure $p_2$ and a predicted second fluid pressure $\langle p_2 \rangle$ predicted using the formula $$\langle p_2 \rangle = (p_1 V_1 + p_0 V_2)/(V_1 + V_2),$$

wherein $V_1$ is the volume of the first fluid storage vessel, which may include the volume of the first fluid lines if not neglectable, and wherein $V_2$ is the volume of the second fluid storage vessel, which may include the volume of the second fluid lines if not neglectable.

Preferably, the test device further comprises:
a third fluid connector configured to fluidly connecting a third fluid storage vessel to the fluid line;
a second vessel valve configured to fluidly connect or disconnect the third fluid connector with the pressure sensor;

Preferably, the test device further comprises:
an information system for retrieving values of the atmospheric pressure at the location of the test device and/or
a location determining means for determining the location of the location of the test device.

A further aspect of the invention relates to a computer program product for a computer-controlled verification or calibration test on a test device, wherein the computer program comprises coding segments that when loaded and executed on a suitable system, preferably the control means of the test device according to claims 10 to 14, can execute a method for carrying out a calibration test on a pressure sensor according to any one of claims 1 to 9.

Additional objects, advantages and features of the present invention will now be described in greater detail, by way of example, with reference to preferred embodiments depicted in the drawings.

DETAILED DESCRIPTION

Figure 1:
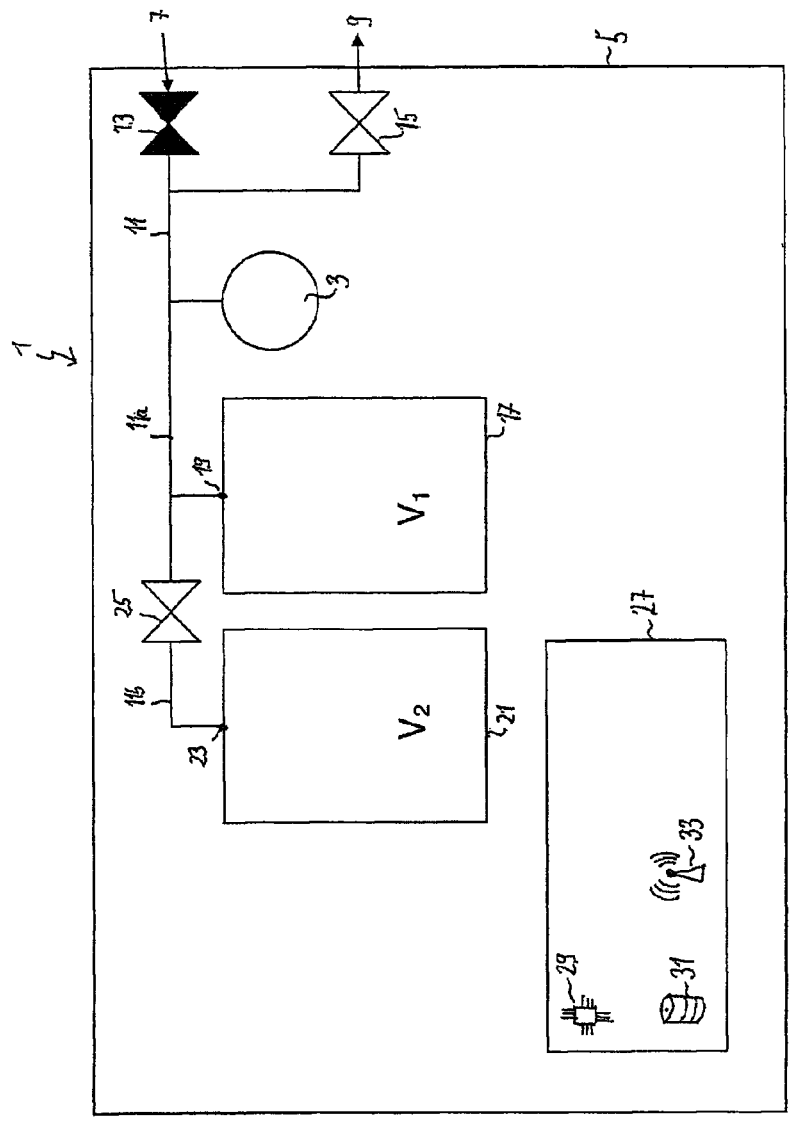
FIGS. 1-7 are schematic illustrations of an embodiment of a test device in different configurations during the performance of the test method.

FIGS. 1 to 7 show a test device 1 for carrying out an automatic verification and/or calibration of a pressure sensor 3. The test device 1 can be part of a test apparatus, for example a test apparatus for performing an integrity test on a filter device (not shown) or any other apparatus, which must comprise a pressure sensor 3 in order to measure a fluid pressure. Therefore, the test device 1 may be located in a housing 5, which further comprises additional electric, electronic, mechanic and/or electromechanic components, which are not intended to perform the verification and/or calibration of the pressure sensor 3, but are provided to perform further tasks needing the pressure sensor 3.

The test device 1 comprises a fluid inlet 7 and a fluid outlet 9. The fluid inlet 7 and/or the fluid outlet 9 can be formed as a fluid connector in the housing 5. The fluid inlet 7 is preferably configured to be connected to a fluid source (not shown). For example the fluid inlet 7 can be fluidly connected to an external pressure vessel, which may contain a pressurized fluid. A fluid in the sense of the invention may comprise a gas, a liquid or a mixture thereof. As an alternative, the fluid source may comprise a fluid compressor, which is configured to provide the fluid with a predetermined fluid pressure at the fluid inlet 7. Although it may be preferred to provide an external fluid source, which is fluidly connectable to the fluid inlet 7, in order to allow an easy maintenance of the fluid source, it has to be understood that the fluid source can also be an internal fluid source, which is located within the housing 5 of the test device 1.

Particularly, the fluid source may provide a gas, preferably a sterile gas, such as compressed air, nitrogen, carbon dioxide and so on.

The pressure sensor 3 is fluidly connected to the fluid inlet 7 by a fluid line 11. Fluid line 11 establishes also a fluid connection between the pressure sensor 3 and the fluid outlet 9. The fluid line 11 further comprises an inlet valve 13 associated with the fluid inlet 7 and an outlet valve 15 associated with the fluid outlet 9. By means of the inlet valve 13 and the outlet valve 15 the pressure sensor 3 can be fluidly connected independently with the fluid inlet 7 and the fluid outlet 9.

Furthermore, the test device 1 comprises a first fluid storage vessel 17, which is connected to the fluid line 11 by means of a first fluid connector 19. The first fluid connector 19 may be formed integrally with the first fluid storage vessel 17. A second fluid storage vessel 21 is connected to the fluid line 11 by means of a second fluid connector 23. Again, the second fluid connector 23 can be formed integrally with a second fluid storage vessel 21. By means of fluid line 11 the first and second fluid storage vessels 17, 21 are fluidly connectable with the pressure sensor 3. The embodiment shown in FIGS. 1 to 7 comprises a vessel valve 25, which is arranged within the fluid line 11 so as to fluidly connect or disconnect the second fluid storage vessel 21 with or from the pressure sensor 3 and the first fluid storage vessel 17. The first fluid storage vessel 17 is permanently fluidly connected with the pressure sensor 3, since there is no valve arranged in the fluid line 11 between the first fluid connector 19 and pressure sensor 3 in the embodiments shown in FIGS. 1 to 7. It has to be understood that a further vessel valve could be placed in fluid line 11 so as to connect or disconnect the first fluid storage vessel 17 from pressure sensor 3. However, for the method to verify or calibrate pressure sensor 3 described below with respect to the embodiment of the test device 1 shown in FIGS. 1 to 7 this additional vessel valve is not required, but just an option.

The test device 1 further comprises a control unit 27 as preferred control means 27, which is configured to control the inlet valve 13, the outlet valve 15 and the vessel valve 25. Therefore, the control unit 27 is connected to the inlet valve 13, the outlet valve 15 as well as the vessel valve 25 in order to switch the state of each of the valves electrically, pneumatically or hydraulically. The connections between the control unit 27 and the valves 13, 15, 25, such as electrical wires or additional control fluid lines, are not shown in the figures. Furthermore, control unit 27 is connected to pressure sensor 3 in order to initiate a pressure measurement and to read and store the measured pressure value within the control unit 27. The connection between the pressure sensor 3 and a control unit 27 is also not shown in the figures.

In order to perform the verification and/or calibration of the pressure sensor 3 automatically, control unit 27 is provided with a microprocessor 29 and storage means 31. Additionally, control unit 27 may be provided with a communication means, which is configured to establish a communication connection to an external apparatus outside from the test device 1. The external apparatus might be a computer system or a display device. The communication means 33 may be configured to establish the communication link wireless or by cable. In particular, the communication means 33 can comprise an USB interface, an ethernet interface, a bluetooth interface, a WLAN interface, any other parallel or serial interface, or an optical interface. The storage means 31 may comprise a read only memory (ROM), a random access memory (RAM), an erasable programmable read only memory (EPROM), a hard disk, a memory card, such as an SD card, a CD drive, a floppy drive and so on.

FIG. 1 shows the test device in an initial state, wherein the inlet valve 13 is closed and the outlet valve 15 and the vessel valve 25 are opened. Closed valves are indicated in the figures by a black filling of a contour. In the initial state, as shown in FIG. 1, the first fluid storage vessel 17, the second fluid storage vessel 21, fluid line 11 and pressure sensor 3 are fluidly connected via the outlet valve 15 with the atmosphere, such that atmosphere pressure conditions are provided in the fluid storage vessels 17, 21 and the pressure sensor 3. The pressure in fluid line 11 can be measured by means of the pressure sensor 3. The reading of pressure sensor 3 can be stored in storage means 31 of control unit 27. Furthermore, the time of the reading to can also be stored together with pressure reading $p_0$ in control unit 27.

Additionally the storage vessel 21 can be equipped with a pressure sensor (not shown in the figures) which is used to verify that the storage vessel 21 is at atmospheric pressure i.e. that the vessel valve 25 works correctly and that there is no residual pressure. The additional pressure sensor is typically of lower accuracy and does not interact in the verification of the pressure sensor 3. It is only provided to verify that the valves are working correctly and that no residual pressure is in the system, which would give incorrect pressure verification and calibration results.

Figure 2:
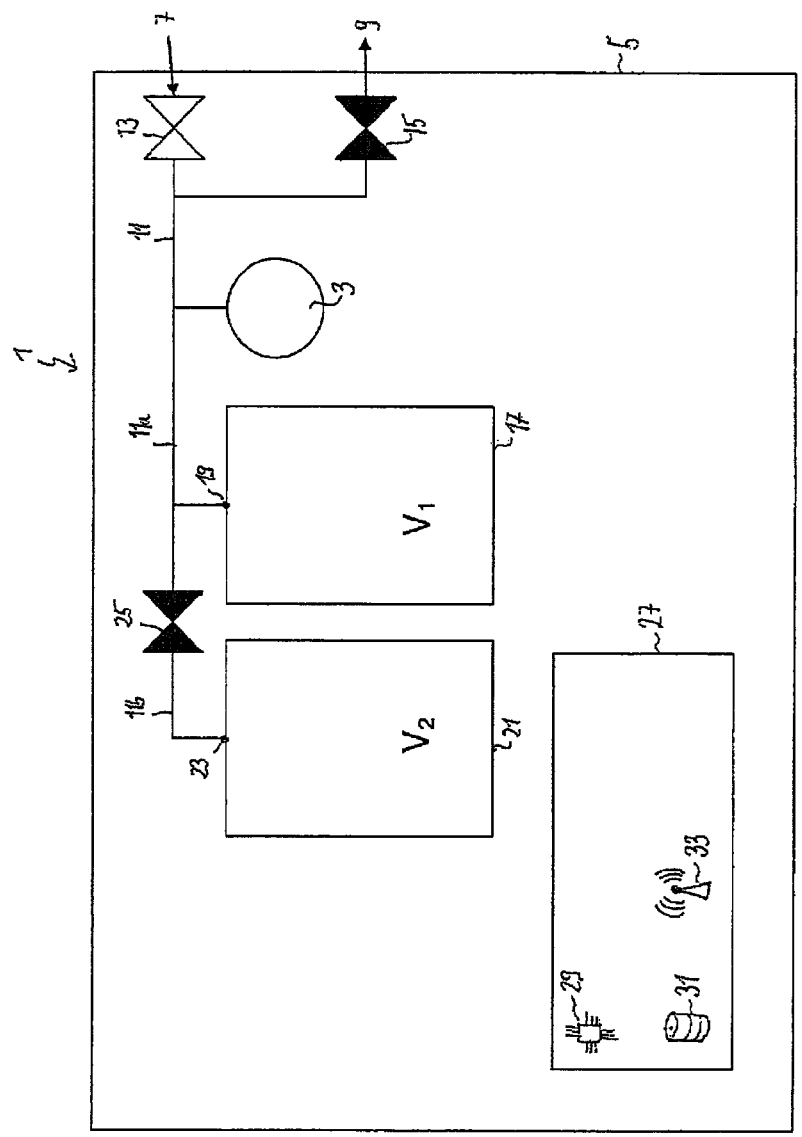

After the initial pressure measurement has been carried out, the test device 1 is brought into the configuration as shown in FIG. 2. As shown in FIG. 2, the vessel valve 25 is closed in order to fluidly disconnecting the second fluid storage vessel 21 from the pressure sensor 3 and first fluid storage vessel 17. The outlet valve 15 is also closed in order to disconnect fluid line 11 from the outside. After the outlet valve 15 is closed the inlet valve 13 is opened so that fluid line 11 is fluidly connected to the fluid source connected to fluid inlet 7. By means of the external fluid source a first fluid pressure $p_1$ is provided at pressure sensor 3 and the first fluid storage vessel 17. After the pressure conditions in fluid line 11, first fluid storage vessel 17 and pressure sensor 3 are brought into an equilibrium with the pressure provided by the external pressure source connected to fluid inlet 7 the inlet valve 13 is closed to disconnect fluid line 11 from the external fluid source.

Figure 3:
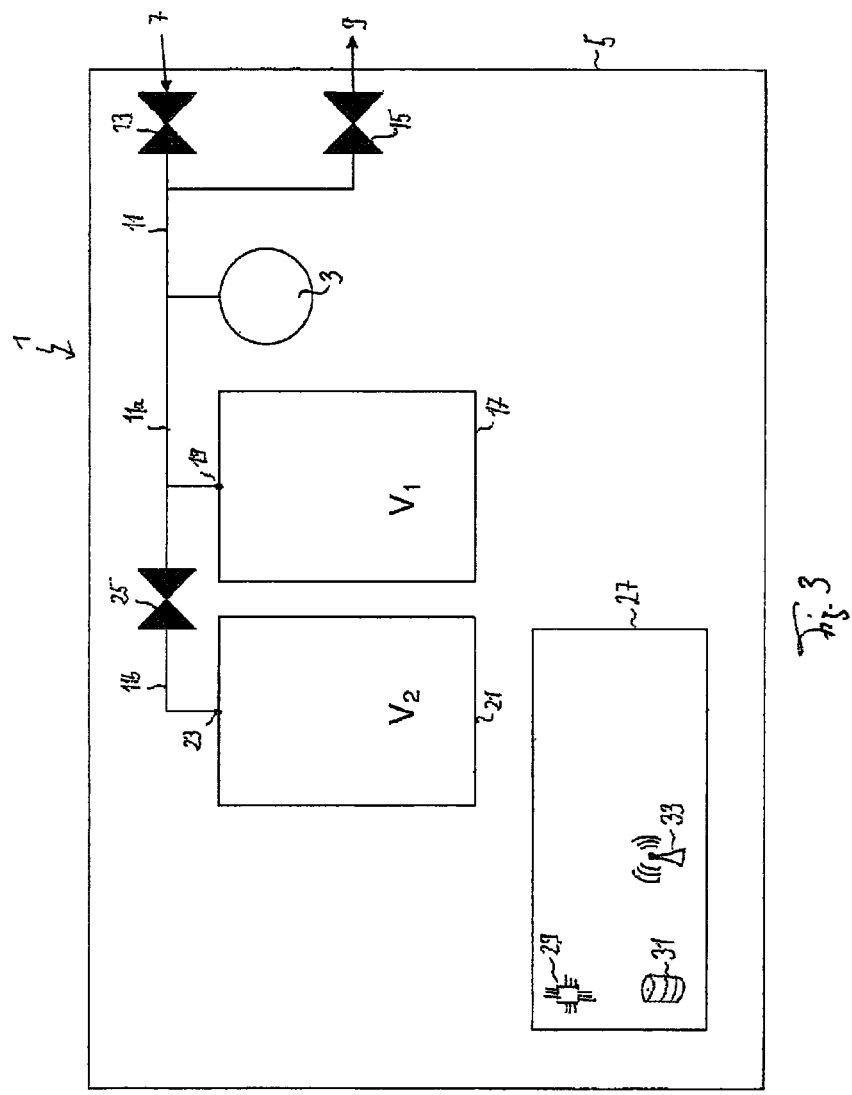
Figure 4:
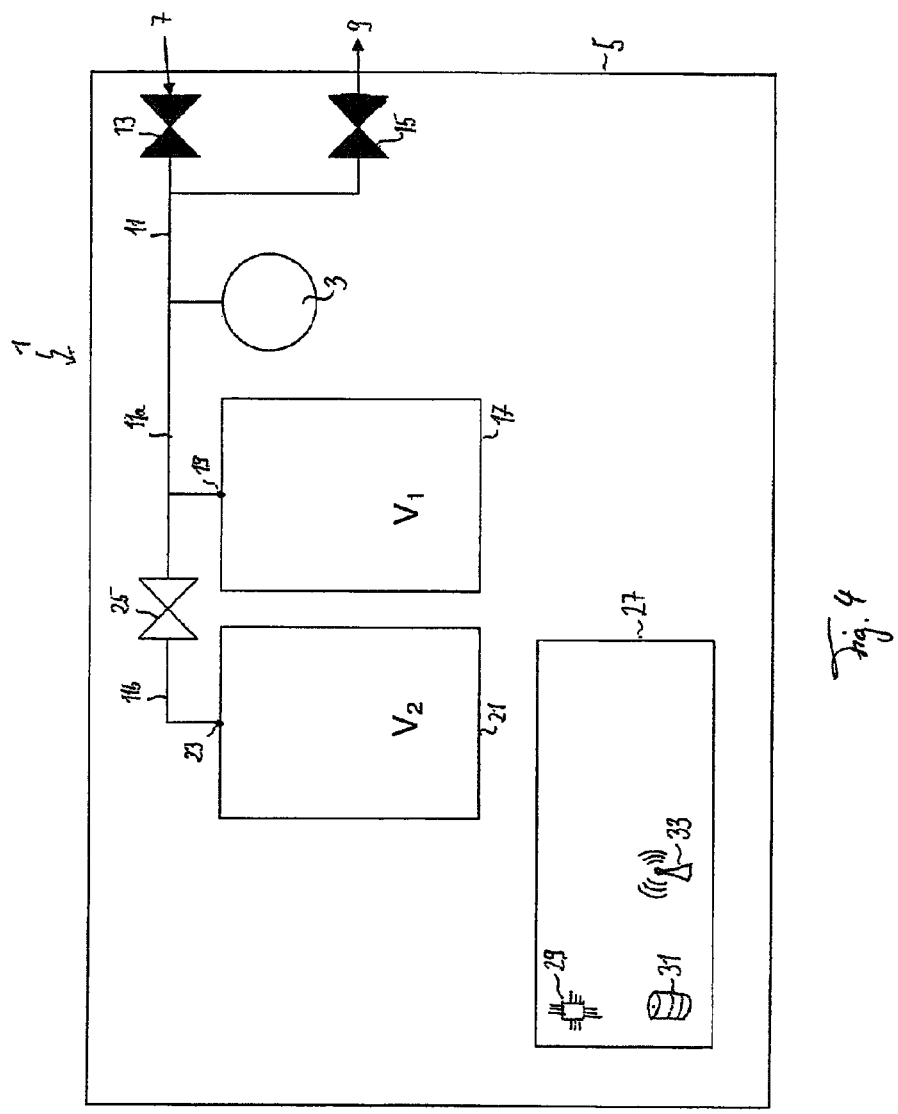

After closing off the inlet valve 13 the test device 1 is in a configuration as shown in FIG. 3. In this configuration the volumes of the first fluid storage vessel 17, a part 11a of the fluid line 11, which is in this configuration fluidly connected to the first fluid storage vessel 17, and pressure sensor 3 connected thereto are filled with the fluid at a pressure $p_1$. The pressure $p_1$ can be measured by means of pressure sensor 3, wherein the reading of pressure sensor 3 and the time $t_1$ at which the pressure measurement is carried out can be stored in storage means 31 of control inlet 27. After the pressure measurement has been carried out the valve vessel 25 is opened so that the test device 1 is in a configuration as shown in FIG. 4.

After the opening of vessel valve 25 the pressure conditions in the first fluid storage vessel 17 and the second fluid storage vessel 21 will equalize. Since the pressure $p_1$ and the first fluid storage vessel 17 is generally higher than the pressure $p_0$, i.e. the atmospheric pressure, in the second fluid storage vessel 21, fluid will flow from the first fluid storage vessel 17 via vessel valve 25 to the second fluid storage vessel 21. After the stabilization time the fluid pressure within the first and second fluid storage vessels 17, 21 and the fluid line 11 will be at an equilibrium. This pressure $p_2$ can be measured by means of pressure sensor 3 and stored together with the time $t_2$ of the pressure measurement in storage means 31 of control unit 27. Pressure $p_2$ is generally larger than the initial pressure $p_0$ and smaller than the pressure $p_1$.

It is also understood that the possible additional pressure sensor (not shown) in vessel 21 can be used to verify that the valve vessel 25 was correctly opened. The pressure measured by this additional sensor (not shown) is not used in order to calibrate the pressure sensor 3.

Under the assumption that the fluid is an ideal gas and the temperature remains constant during the test, the pressure $p_2$ can be predicted using the ideal gas law. In case the temperature of a fluid is not constant during the test procedure, a temperature sensor can be provided additionally to the pressure sensor 3 or in any of the vessels or in all vessels in order to measure the fluid temperature. The influence of the temperature can also be considered by using the ideal gas law.

Figure 5:
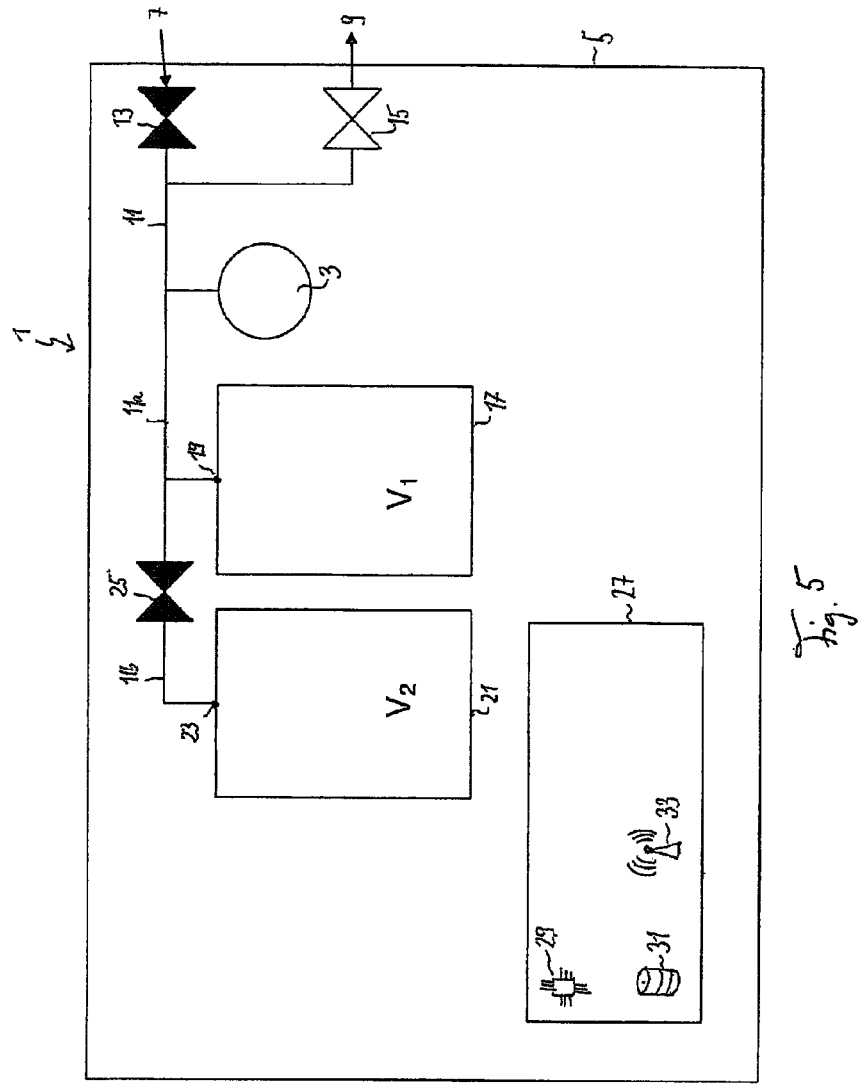
Figure 6:
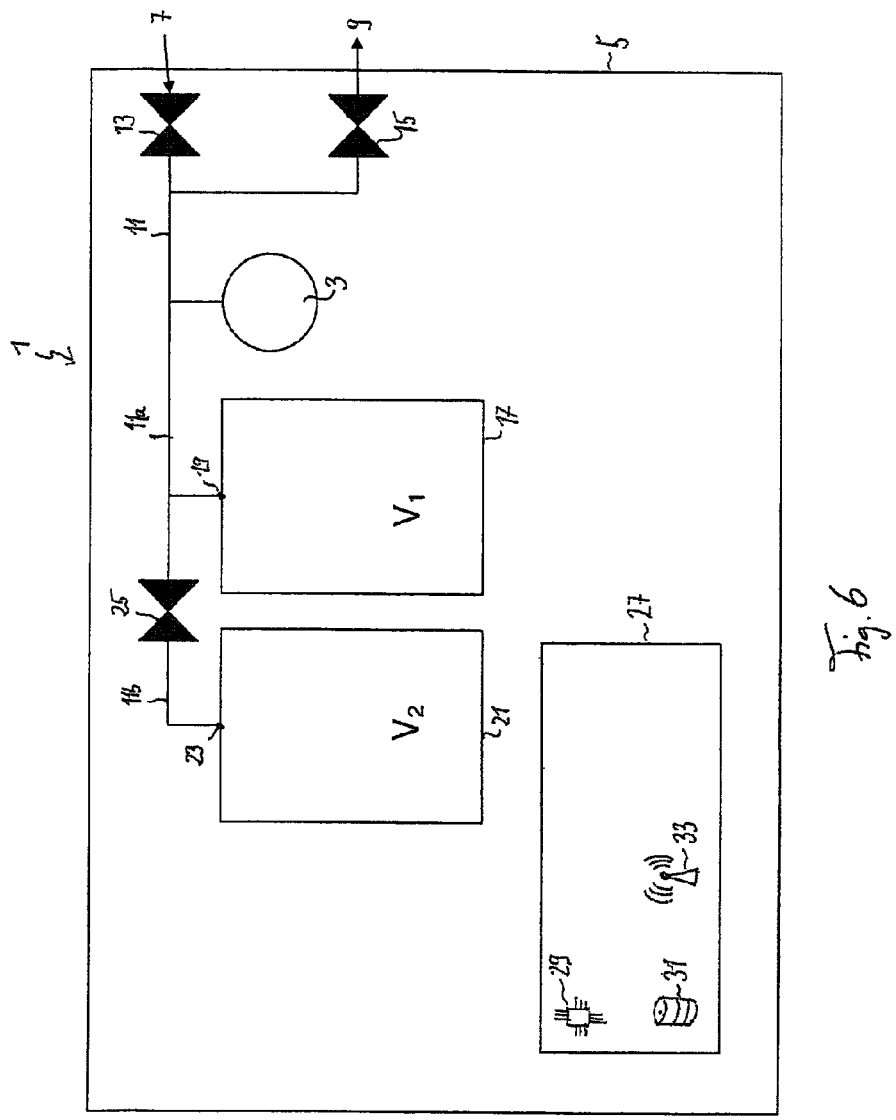

In order to enhance the result of the test procedure further pressure measurements can be carried out. To do so the vessel valve 25 is closed and the outlet valve 15 is opened so that the test device is in a configuration as shown in FIG. 5. While the fluid in the second fluid storage vessel 21 remains at a pressure $p_2$, fluid can be discharged from the first fluid storage vessel 17 and the fluid line 11 through the fluid outlet 9 until atmospheric pressure conditions are present in the first fluid vessel 17 and fluid line 11. After a predetermined time of discharging fluid outlet valve 15 is closed. Optionally a pressure measurement can be carried out by means of pressure sensor 3 in order to verify that atmospheric pressure conditions are present in the volumes of the first fluid storage vessel 17 and the part of fluid line 11 connected thereto. The reading of pressure sensor 3 should correspond to the pressure $p_0$ measured at the time $t_0$ as measured in the initial state of test device 1, as shown in FIG. 1.

Figure 7:
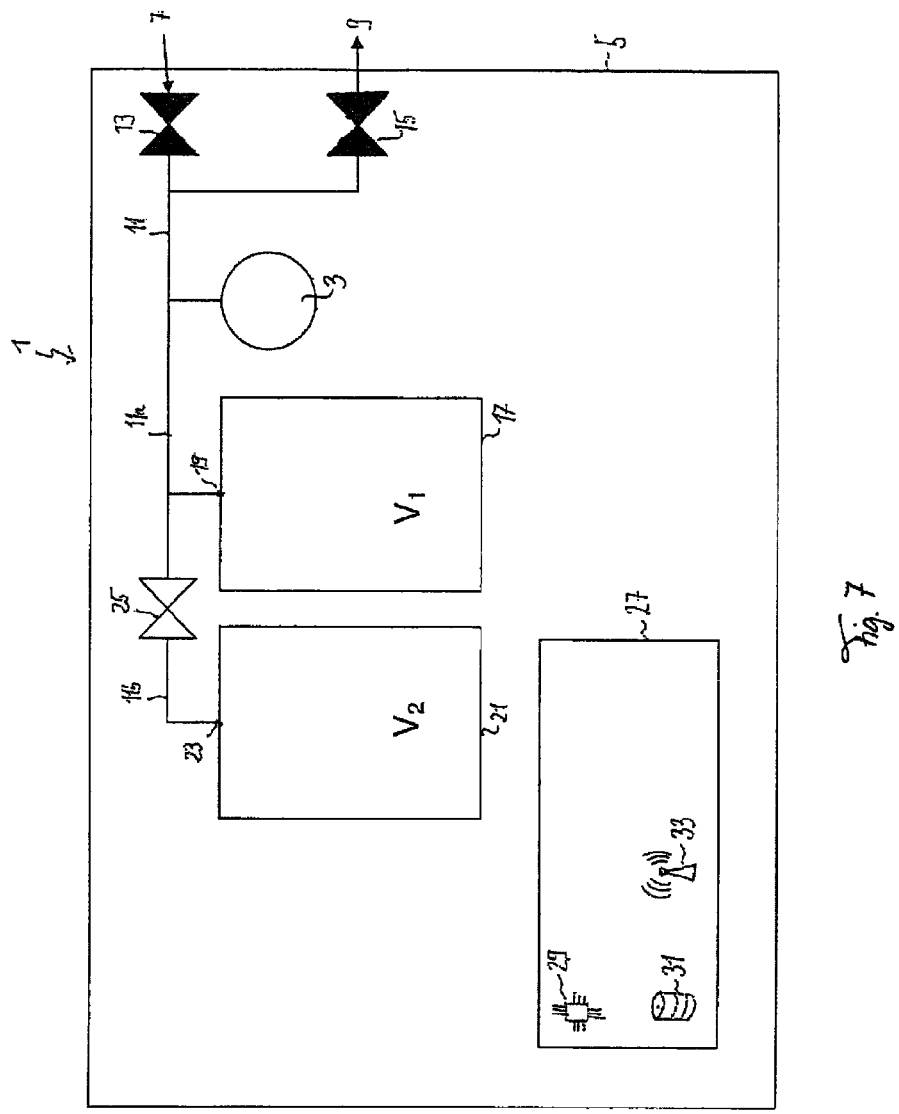

By opening the vessel valve 25 the test device is brought into a configuration as shown in FIG. 7. Again, the fluid pressure in the first and second fluid storage vessels 17, 21 and fluid line 11 will equalize to a pressure $p_3$, which is larger than the atmospheric pressure and smaller than pressure $p_2$. After a predetermined time of stabilization a further pressure measurement can be carried out by means of pressure sensor 3. The pressure $p_3$ measured at the pressure sensor 3 can be stored together with a time of measurement $t_3$ in the storage means 31 of control unit 27.

Alternatively or additionally vessel 21 can also be equipped with a vent valve (not shown in the figures). This is preferable when the vessel 21 is greatly smaller than the vessel 17. Maintaining p2 within vessel 17 and bringing vessel 21 to atmospheric pressure, followed by closing the vent valve (not shown) followed by opening the vessel valve 25 to create $p_3$ would generate a pressure value $p_3$ which is closer to the pressure value $p_2$, thus allowing for more pressure verification points with smaller pressure differences: $p_0 \ll p_3 \leqslant p_2$.

FIGS. 8 to 12 show a further embodiment of a test device 1 for carrying out an automatic verification and/or calibration of pressure sensor 3. As described with regard to the embodiment shows in FIGS. 1 to 7, the test device 1 can be part of a test apparatus, for example a test apparatus for performing an integrity test on a filter device (not shown) or any other apparatus, which comprises a pressure sensor 3 in order to measure a fluid pressure. The elements of the test device 1 shown in FIGS. 8 to 12, which are identical to the elements of the embodiment shown in FIGS. 1 to 7, are labelled with identical reference signs and the description of these elements with regard to FIGS. 1 to 7 applies mutatis mutandis to the elements shown in FIGS. 8 to 12.

Particularly, the test device 1 comprises a housing 5, a fluid inlet 7 and a fluid outlet 9, wherein the fluid inlet 7 and/or the fluid outlet 9 can be formed as a fluid connector. As an option the fluid inlet 7 and/or the fluid outlet 9 can be formed integrally with the housing 5. The fluid inlet 7 can be configured to be connected to an external fluid source or to an internal fluid source. In case the fluid source is an internal fluid source, the fluid inlet 7 may be formed as an internal fluid connection or fluid connector between fluid line 11 and the fluid source. The fluid source may configured to provide a gas, preferably a sterile gas, such as compressed air, nitrogen, carbon dioxide and so on, a liquid, such as water, sterile water, alcohol and so on or a mixture thereof.

Pressure sensor 3 is fluidly connected to the fluid inlet 7 and the fluid outlet 9 by fluid line 11. An inlet valve 13 is associated with the fluid inlet 7, i.e. placed within the fluid line 11 between fluid inlet 7 and pressure sensor 3, and an outlet valve 15 is associated with the fluid outlet 9, i.e. placed within the fluid line 11 between fluid outlet 9 and pressure sensor 3. By means of the inlet valve 13 and the outlet valve 15 the pressure sensor 3 can be independently fluidly connected with or disconnected from the fluid inlet 7 and the fluid outlet 9.

The embodiment of the test device 1 shown in FIGS. 8 to 12 comprises a first fluid connector 19, a second fluid connector 23, and a third fluid connector 35. It has to be understood that the test device 1 may also comprise one or more further fluid connector(s). The fluid connectors 19, 23, and 35 are configured to be connectable to a corresponding fluid storage vessel. The embodiment shown in FIGS. 8 to 12 comprises three fluid storage vessels 17, 21, and 37. As an option at least one of these fluid storage vessels can be an external fluid storage vessel. In this case the corresponding one of the fluid connectors 19, 23, and 35 may be configured to connect the external fluid storage vessel outside housing 5 with the fluid line 11 inside the housing 5. Preferably, one or more of the fluid connectors 19, 23, and 35 may be formed integrally with the housing 5.

As an alternative any one of the fluid connectors 19, 23, 35 may be formed integrally with the corresponding one of the fluid storage vessels 17, 21, 37. Particularly, test device 1 may comprise any one of the fluid storage vessels 17, 21, 37 as an internal fluid storage vessel. In other words, each of the plurality of fluid storage vessels, particularly all fluid storage vessels may be contained within the housing 5 of the test device 1.

By means of fluid line 11 the each of the fluid storage vessels 17, 21, 37 is fluidly connectable to the pressure sensor 3. The embodiment shown in FIGS. 8 to 12 comprises a vessel valve 25, which is arranged within the fluid line 11 so as to fluidly connect or disconnect the second fluid storage vessel 21 with or from the pressure sensor 3 and the first fluid storage vessel 17. Furthermore, a second vessel valve 39 is arranged and configured within the fluid line 11 so as to fluidly connect or disconnect the third fluid storage vessel 37 with or from pressure sensor 3, first fluid storage vessel 17, and second fluid storage vessel 21. In contrast, the first fluid storage vessel 17 is permanently fluidly connected with pressure sensor 3.

The control unit 27 of test device 1 is configured to control inlet valve 13, outlet valve 15, vessel valve 25, and second vessel valve 39. As described with respect to the embodiment shown in FIGS. 1 to 7, the control unit 27 is connected to inlet valve 13, outlet valve 15, vessel valve 25 as well as the second vessel valve 39 in order to switch the state of each of the valves. Control unit 27 is also connected to pressure sensor 3 in order to initiate a pressure measurement and to read and store the measured pressure value.

Figure 8:
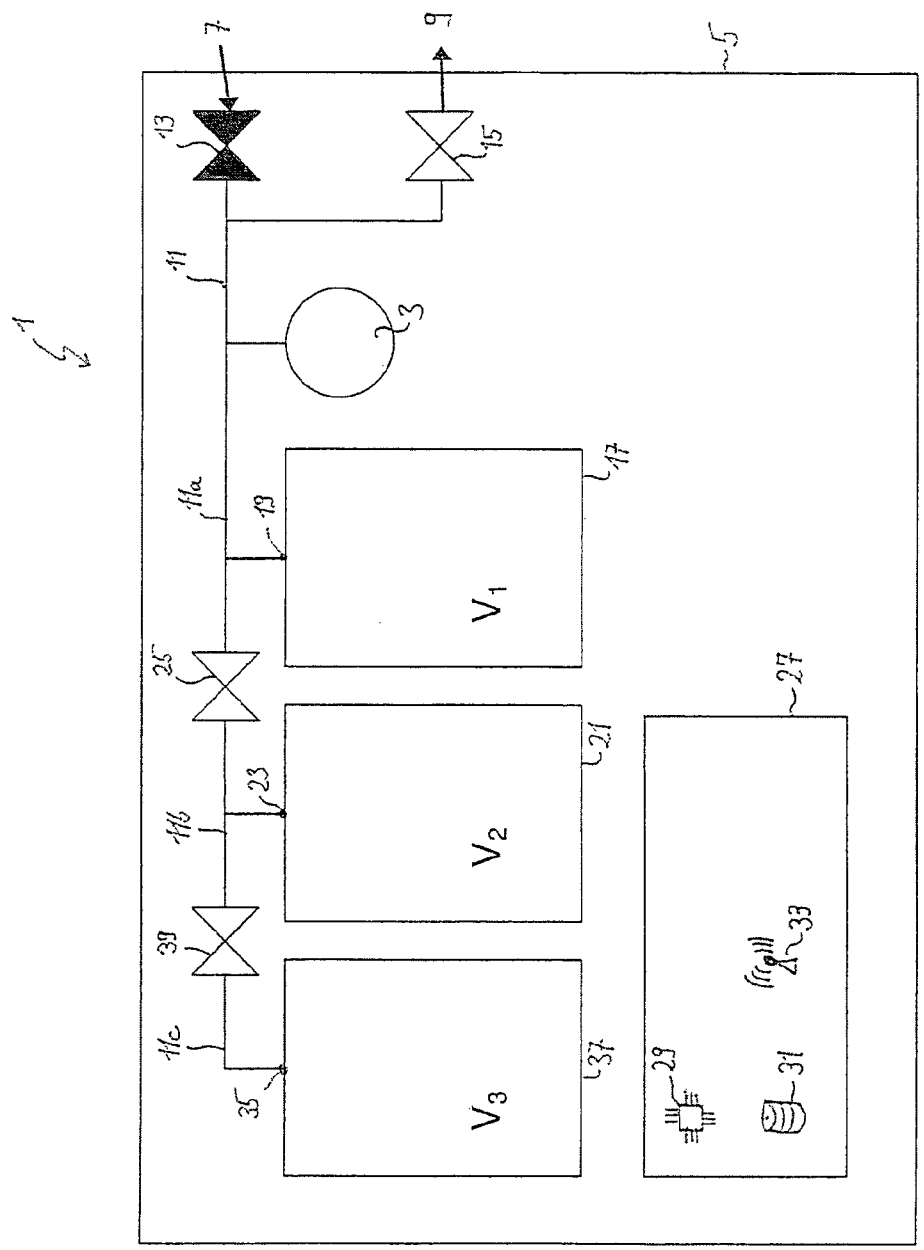
FIGS. 8-12 are schematic illustrations of another embodiment in different configurations during the performance of the test method.

FIG. 8 shows the test device 1 in an initial state, wherein the inlet valve 13 is closed and outlet valve 15, vessel valve 25, and second vessel valve 39 are opened. Closed valves are indicated in the figures by a black filling of the contour of the respective valve. In the initial state, as shown in FIG. 8, the all fluid storage vessels 17, 21, 37, fluid line 11 and pressure sensor 3 are fluidly connected via the outlet valve 15 with the atmosphere, such that atmosphere pressure conditions are provided in these elements. The pressure in fluid line 11, and therefore in the fluid storage vessels 17, 21, 37 fluidly connected thereto, can be measured by means of pressure sensor 3. The reading of pressure sensor 3 can be stored in storage means 31 of control unit 27. Furthermore, the time of the reading t0 can also be stored together with pressure reading p0 in control unit 27.

Additionally or additionally the storage vessels 21 and 37 can be equipped with pressure sensors (not shown in the figures) which are used to verify that the storage vessel 21 and 37 are at atmospheric pressure i.e. that the vessel valve 25 and 39 work correctly and that there is no residual pressure. The additional pressure sensors of typically lower accuracy do not interact in the verification of the pressure sensor 3. They are only there to verify that the valves are working correctly and that no residual pressure is in the system which would give incorrect pressure verification and calibration results.

Figure 9:
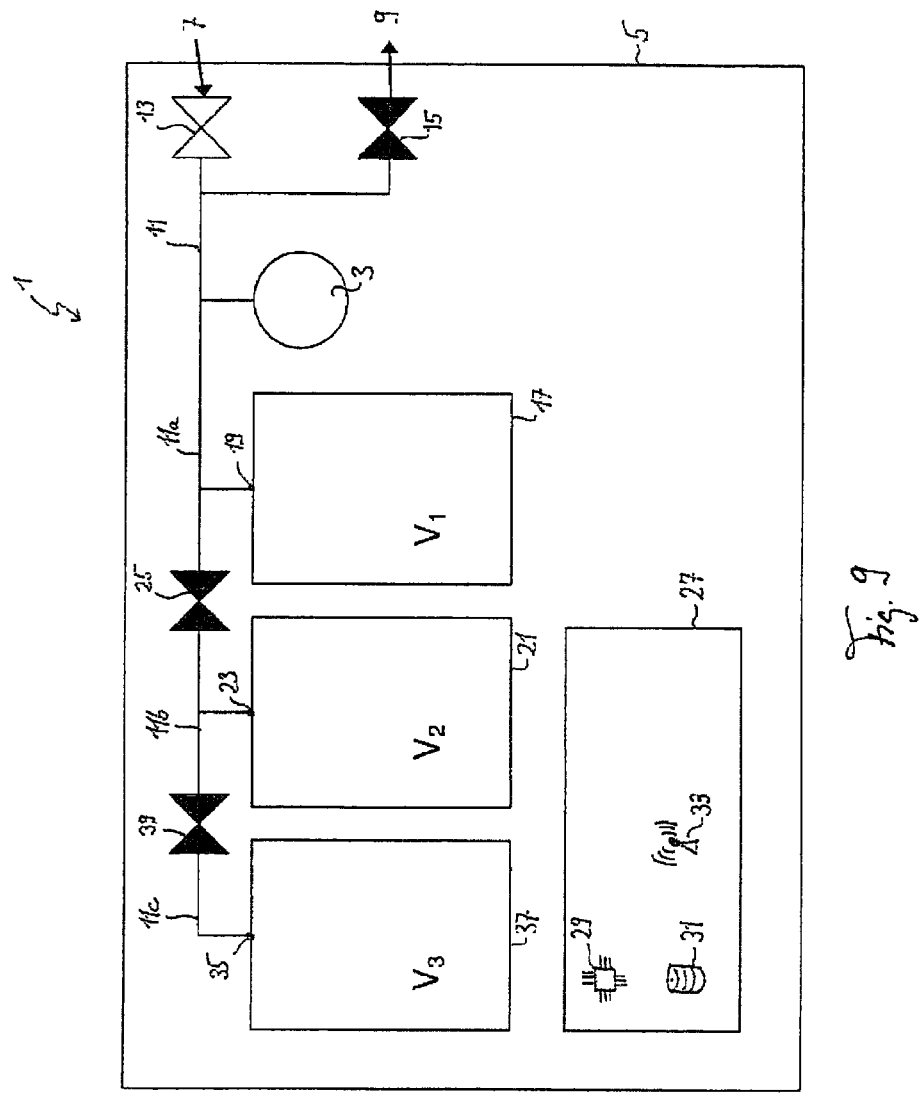

After the initial pressure measurement has been carried out, the test device 1 is brought into the configuration as shown in FIG. 9 by closing vessel valve 25, second vessel valve 39 and outlet valve 15. Thus, the second and third fluid storage vessels 21, 37 are fluidly disconnected from pressure sensor 3 and first fluid storage vessel 17. Further, fluid line 11 is fluidly disconnected from the outside. After outlet valve 15 is closed inlet valve 13 is opened to fluidly connect fluid line 11 to the fluid source (not shown) connected to fluid inlet 7. By means of the fluid source a first fluid pressure p1 is provided at pressure sensor 3 and the first fluid storage vessel 17. After the pressure conditions in fluid line 11, first fluid storage vessel 17 and pressure sensor 3 are brought into an equilibrium with the pressure provided by the pressure source, i.e. after a stabilization time, inlet valve 13 is closed to disconnect fluid line 11 from the external fluid source, such that test device 1 is in a configuration as shown in FIG. 10.

Figure 10:
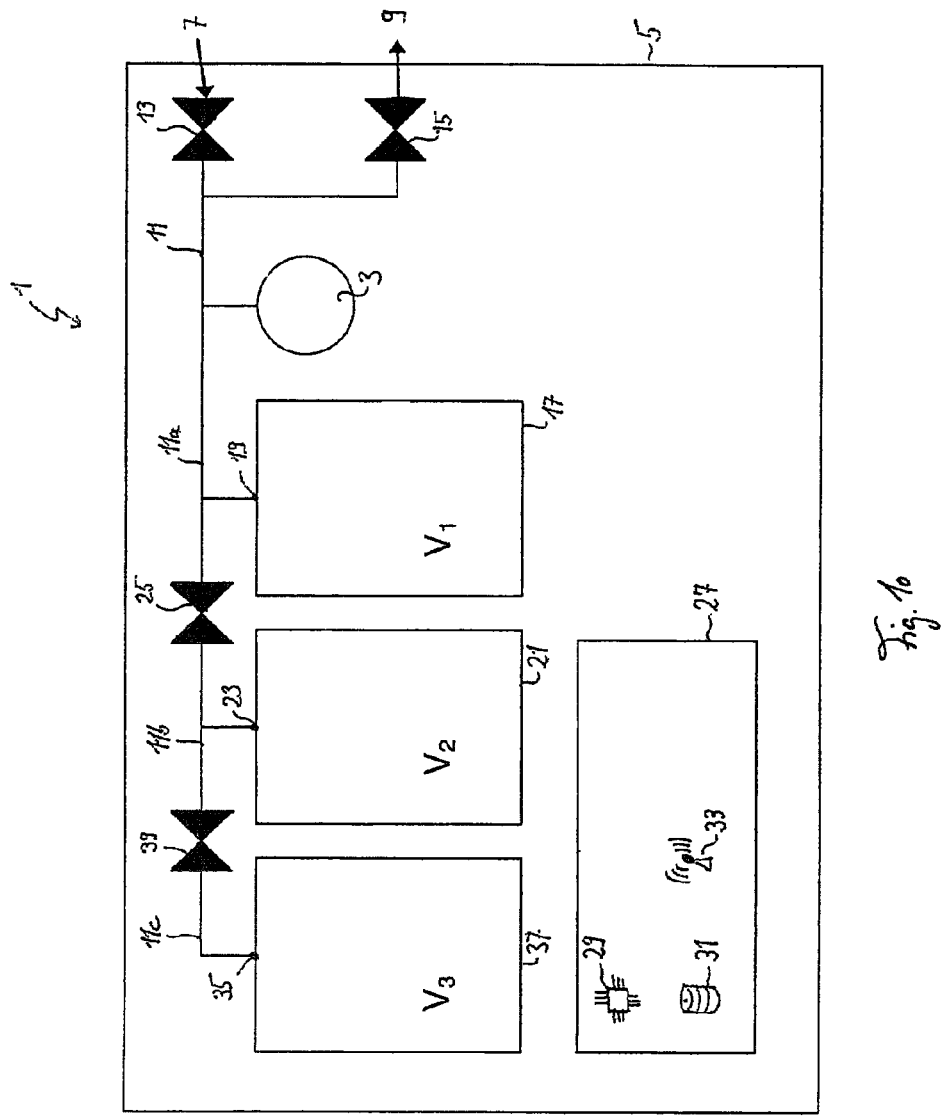
Figure 11:
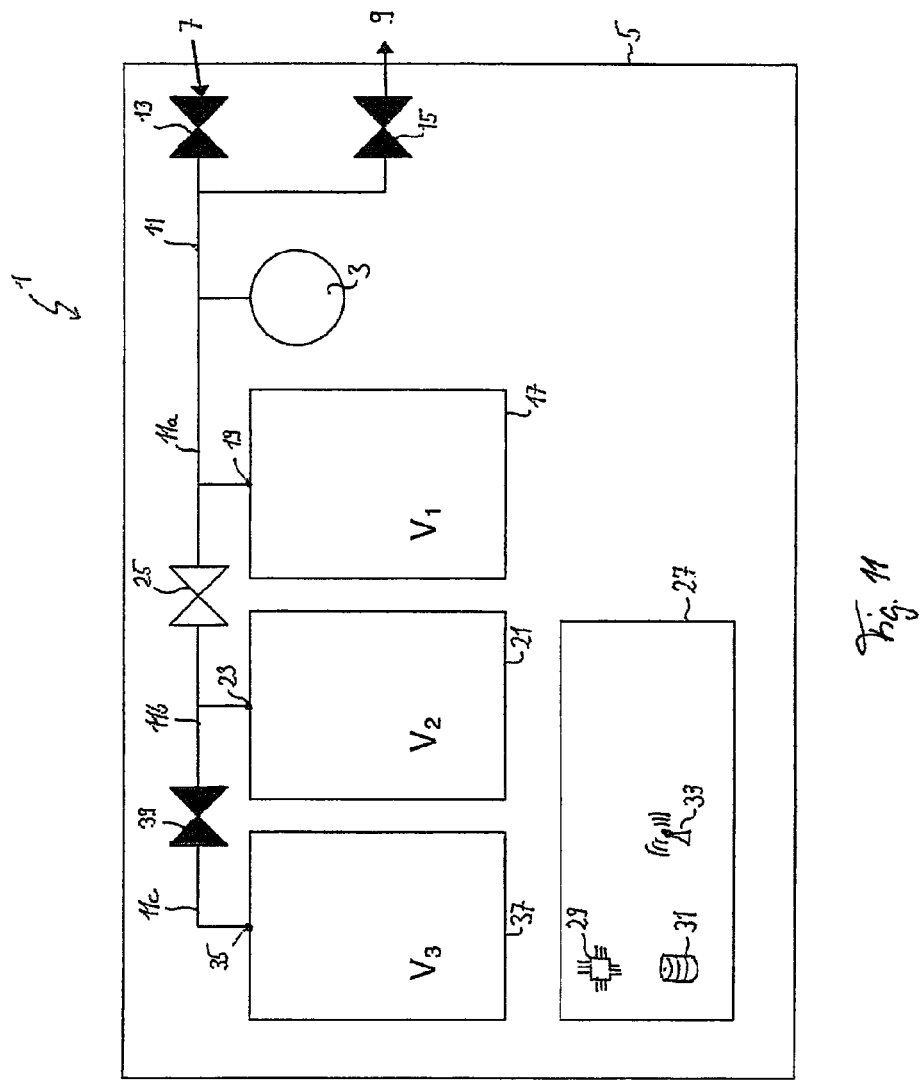
Figure 12:
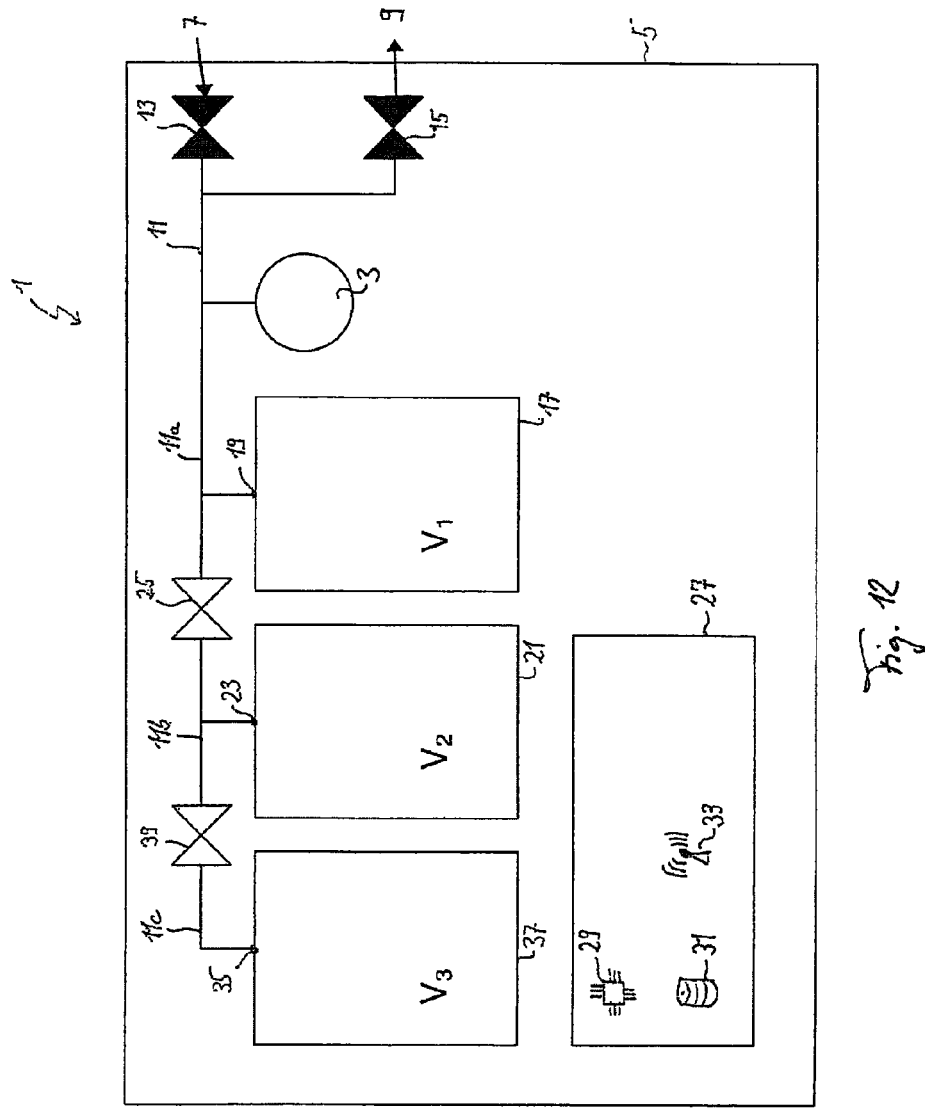

In the configuration shown in FIG. 10 a pressure p1 is applied to the volumes of the first fluid storage vessel 17, a part 11a of the fluid line 11 which is in this configuration fluidly connected to the first fluid storage vessel 17 and pressure sensor 3. The pressure p1 can be measured by means of pressure sensor 3, wherein the reading of pressure sensor 3 and the time t1 at which the pressure measurement is carried out can be stored by storage means 31 of control inlet 27. After the pressure measurement has been carried out the valve vessel 25 is opened so that the test device 1 is in a configuration as shown in FIG. 11.

After the opening of vessel valve 25 the pressure conditions in the first and second fluid storage vessel 17, 21 will equalize. Since the pressure p1 and the first fluid storage vessel 17 is generally higher than the pressure p0, i.e. the atmospheric pressure, in the second fluid storage vessel 21, fluid will flow from the first fluid storage vessel 17 via vessel valve 25 to the second fluid storage vessel 21. After a predetermined stabilization time the fluid pressure within the first and second fluid storage vessels 17, 21 and parts 11a, 11b of the fluid line 11 fluidly connected thereto in this configuration will be at an equilibrium. This pressure p2 can be measured by means of pressure sensor 3 and stored together with the time t2 of the pressure measurement by storage means 31 of control unit 27. Pressure p2 is generally larger than the initial pressure p0 and smaller than the pressure p1.

It is also understood that the possible additional pressure sensor (not shown) in vessel 21 can be used to verify that the valve vessel 25 was correctly opened. The pressure measured by this additional sensor (not shown) is not used in order to calibrate the pressure sensor 3.

Additional pressure measurements can be carried out for fluid pressures which are lower than pressure p2 by performing the following steps. Second vessel valve 39 is opened transforming test device 1 into the configuration shown in FIG. 12. Fluid will flow from the first and second fluid storage vessels 17, 21 via the second vessel valve 39 to the third fluid storage vessel 37. After a predetermined stabilization time the fluid pressure within the first, second, and third fluid storage vessels 17, 21, 37 and fluid line 11 will be at an equilibrium. This pressure p3 can be measured by means of pressure sensor 3 and stored together with the time t3 of the pressure measurement by storage means 31 of control unit 27. Pressure p3 is generally larger than the initial pressure p0 and smaller than intermediate pressure p2.

It is also understood that the possible additional pressure sensor (not shown) in vessel 37 can be used to verify that the valve vessel 39 was correctly opened. The pressure measured by this additional sensor is not used in order to calibrate the pressure sensor 3.

In order to perform a verification or a calibration of pressure sensor 3, the readings of pressure sensor 3 can be compared to predicted or computed pressure value, which are used as a reference. As described with regard to the embodiments shown in FIGS. 1 to 12, the atmospheric pressure can be used as a reference. Generally, the atmospheric pressure can be assumed to be in a range of about 950 hPa to about 1050 hPa depending on the actual weather conditions and the elevation over sea level of the location where the measurements are carried out. An exact verification of the initial pressure $p_0$ is possible in case the real atmospheric pressure $<p_0>$ at the time of the initial pressure measurement to is known, for example by a measurement by means of a reference pressure sensor. However, the atmospheric pressure $<p_0>$ used as the reference can also be estimated with a sufficient precision using other informations so that a second reference pressure sensor can be omitted.

Figure 13:
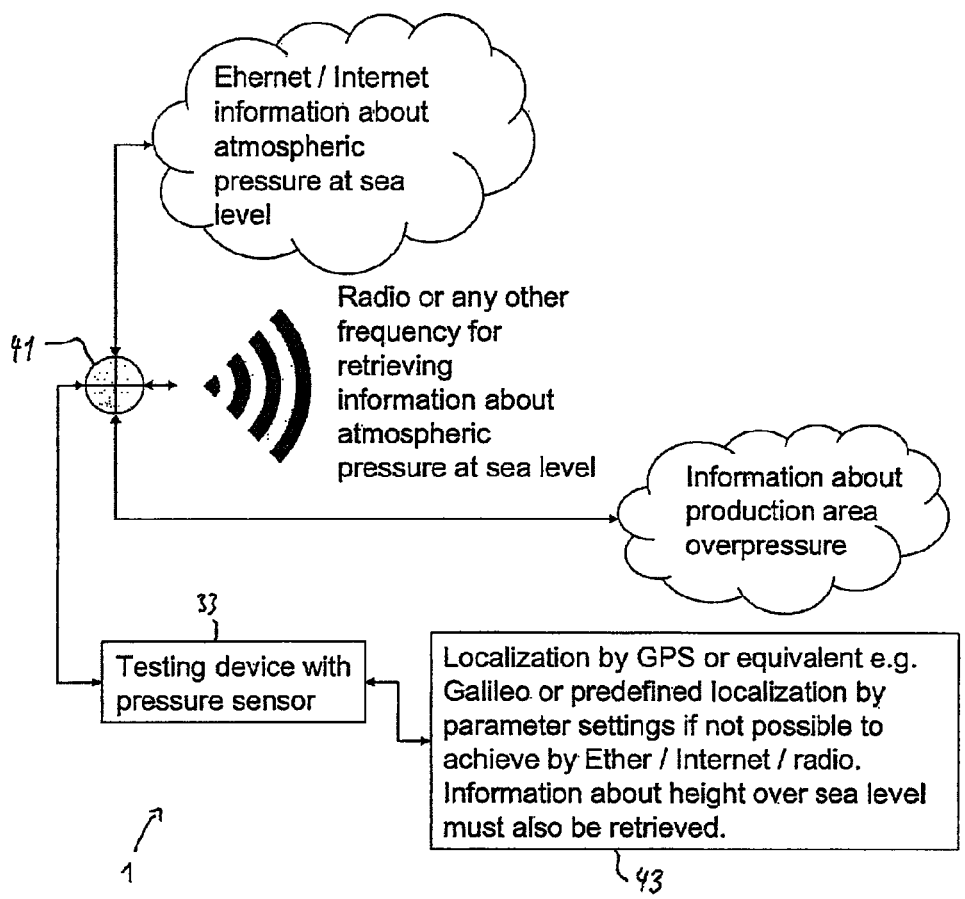
FIGS. 13-14 show an information system and location determining means connectable to the test devices shown in FIGS. 1 to 12.

As shown in FIG. 13 the test device 1 may be connected via communication means 33 with an information system 41, which is capable to provide actual weather data comprising the actual atmospheric pressure data at locations around the location of the test device 1. The information system 41 can comprise means for establishing an internet connection for connecting to one or more servers providing weather information. Furthermore, the information system 41 can comprise means for connecting to one or more external devices for measuring the atmospheric pressure at or near the location of test device 1 or at sea level. If required the information system 41 can also be connected to means for gathering information about actual overpressure or underpressure conditions at the location of the test device 1, for example overpressure or underpressure conditions caused by air conditioning, vacuum devices, fans, and so on. Additionally, the test device 1 can comprise or be connected to location determining means 43, such as a GPS or Galileo receiver, in order to determine its own location in terms of latitude, longitude and/or altitude in order to predict the actual atmospheric pressure. For example can the latitude and longitude determined by means of the location determining means 43 be used to retrieve the corresponding atmospheric pressure value $<p_0>$ via the information system 41. Furthermore, the altitude determined by means of the location determining means 43 can be used to compute the atmospheric pressure value $<p_0>$ using the barometric formula based on a known atmospheric pressure at sea level.

Figure 14:
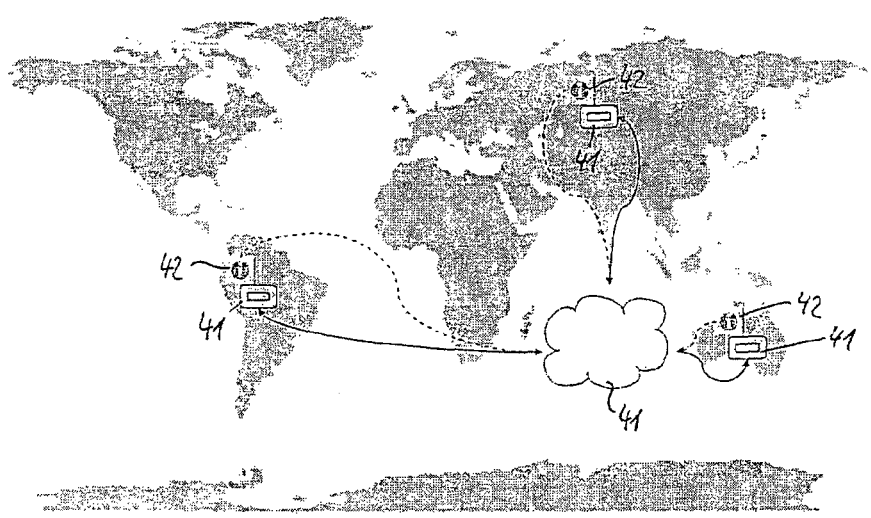

As an option the information system 41 may comprise a database containing the atmospheric pressure values at a specific location at a specific time. As shown in FIG. 14 the atmospheric pressure values could be collected from pressure measurement devices 42 around the world. A test device 1 could connect to the database of the information system 41 in order to retrieve the recent atmospheric pressure reading of the closest pressure measurement device 42. The interface between the database and the test device 1 may be realized by means of a website. Particularly, the interface may provide the data as human readable output. The test device 1 may retrieve the recent atmospheric pressure values as well as the time of measurement. In case the time of measurement of the most recent atmospheric pressure values is longer than 10 minutes, 1 hour, 6 hours or longer ago, the test device 1 may forward a notice to the user that there is no actual atmospheric pressure data available so that the calibration of the test device 1 is carried out at a later time, when an actual value of the atmospheric pressure is available.

Furthermore, the test device 1 may retrieve multiple recent atmospheric pressure values of the nearest pressure measurement location and/or the most recent atmospheric pressure values from different locations in an area around the location of the test device 1. The test device 1 may calculate whether the atmospheric pressure is changing in short time at one measurement location and/or whether the atmospheric pressure is changing within the area around the location of the test device 1. In each case the test device 1 may generate a warning notice to the user that the calibration of the test device 1 might be unreliable due to the uncertainty of the atmospheric pressure value used for calibration. E.g. such a warning notice might be generated in case the atmospheric pressure is changing for more than 5 mbar per hour at a specific location of the pressure measurement device. Moreover, a warning notice might be generated in case the atmospheric pressure is changing for more than 5 mbar within an area having a radius of 5 kilometers from the location of the test device 1.

As an option the warning message might alternatively or additionally be generated by the information system 41. The information system 41 may determine, whether the atmospheric pressure conditions are too inhomogeneous (high variation depending on location) or too instable (high variation depending on time) to perform a calibration of a test device 1 is a specific area. This warning might be transmitted to the test device 1.

The information system 41 might also provide a time reference for the test device 1. In other words, the test device 1 might synchronize its internal clock with the information system 41.

Figure 15:
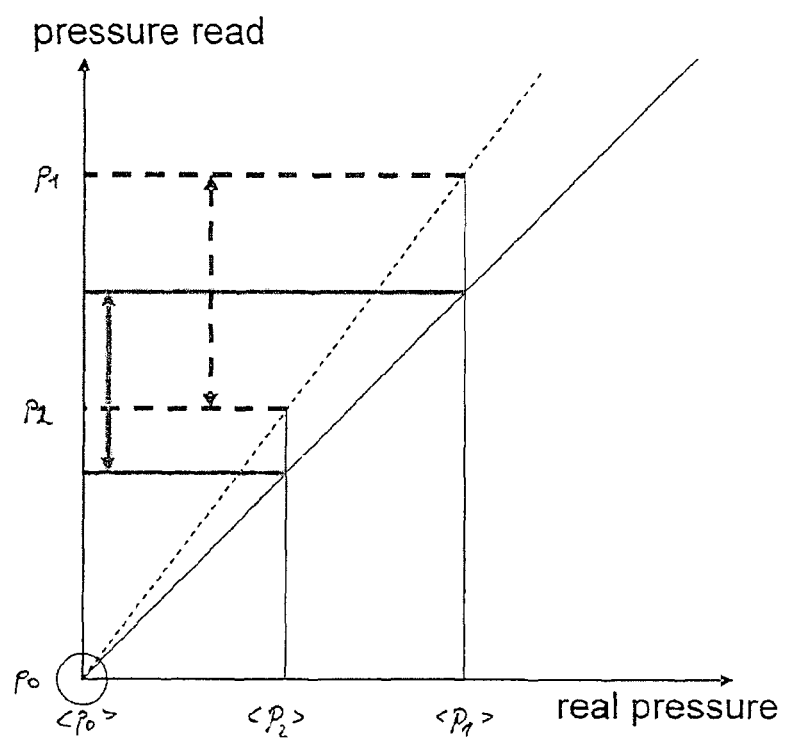
FIGS. 15-16 show diagrams illustrating the correlation of measured fluid pressures and predicted fluid pressures.
Figure 16:
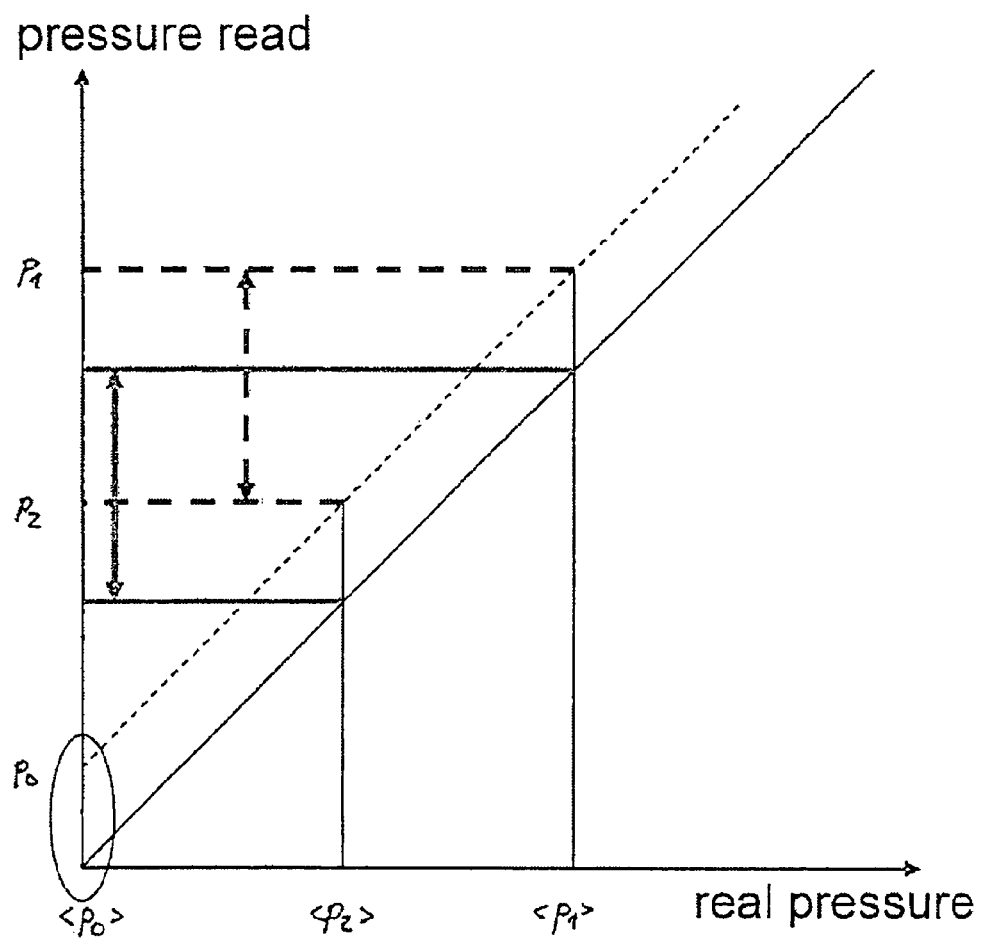

FIGS. 15 and 16 show diagrams, wherein the horizontal axis represents the real fluid pressure applied to the pressure sensor 3, as predicted using the above discussed formulas, and the vertical axis represents the readings of the pressure sensor 3. The 45 degree axis drawn as a solid line in the diagram represents the ideal line, wherein the measured pressures exactly match the real pressures. However, a more or less larger deviation from the ideal line has to expected in a real test device caused by a plurality of different measurement errors.

In FIG. 15 the measured first and second fluid pressures p1, p2 and the corresponding predicted first and second fluid pressures $<p1>$, $<p2>$ exactly define a regression line, which is drawn as dashed line. The regression line intersects the junction of the horizontal axis and vertical axis, i.e. the point with the coordinates (p0, $<p0>$). In other words, the pressure sensor 3 in this case is capable to exactly measure the initial fluid pressure p0. However, the slope of the regression line deviates from the ideal line indicating that pressure differences are not well measured by the pressure sensor. In fact, as shown in FIG. 15, the difference between the measured fluid pressures p1, p2 are larger than the real first and second fluid pressures $<p1>$, $<p2>$, and thus, the regression line is located above the ideal line.

As the regression line is defined by only two pairs of measured and predicted fluid pressure values p1, $<p1>$, and p2, $<p2>$ the correlation coefficient of the regression is exactly 1.0 and cannot be used to quantify the quality of the correlation or matching between measured and predicted fluid pressures, and thus the quality of the pressure sensor. However, the regression can also be based on three, four or more pairs of measured and predicted fluid pressure values.

FIG. 16 shows the case, wherein an offset error occurs in the measurement of the pressure sensor 3. While the slope of the regression line matches the slope of the ideal line, the regression line insects the junction of the and vertical axis at a value greater than zero. In the case shown in FIG. 16, the pressure sensor will provide correct readings of pressure differences, but all readings of the fluid pressure will be too high by a constant amount.

The regressions lines shown in FIGS. 15 and 16 can be used as a calibration function in order to correct measurement of the pressure sensor 3 and, thus, to obtain more precise pressure measurements.

LIST OF REFERENCE SIGNS

1 test device
3 pressure sensor
5 housing
7 fluid inlet
9 fluid outlet
11 fluid line
13 inlet valve
15 outlet valve
17 first fluid storage vessel
19 first fluid connector
21 second fluid storage vessel
23 second fluid connector
25 vessel valve
27 control unit
29 microprocessor
31 storage means
33 communication means
35 third fluid connector
37 third fluid storage vessels
39 second vessel valve
41 information system
43 location determining means

The invention claimed is:
1. A method for carrying out a verification and/or a calibration test on a pressure sensor (3), the method comprising the steps of:

fluidly connecting the pressure sensor (3) to a first fluid storage vessel (17);
fluidly connecting the pressure sensor (3) to a second fluid storage vessel (21);
providing an initial fluid pressure $p_0$ at the pressure sensor (3), the first fluid storage vessel (17) and the second fluid storage vessel (21);
carrying out a pressure measurement of the initial fluid pressure $p_0$ at a time $t_0$ by means of the pressure sensor (3);
fluidly disconnecting the second fluid storage vessel (21) from the pressure sensor (3) and the first fluid storage vessel (17)
providing a first fluid pressure $p_1$ at the first fluid storage vessel (17);
carrying out a pressure measurement of the first fluid pressure $p_1$ at a time t1 by means of the pressure sensor (3);
fluidly connecting the second fluid storage vessel (21) with the pressure sensor (3) and the first fluid storage vessel (17), so that a second fluid pressure $p_2$ is provided at the pressure sensor (3), wherein the second fluid pressure is between the initial fluid pressure $p_0$ and the first fluid pressure $p_1$;
carrying out a pressure measurement of the second fluid pressure $p_2$ at a time t2 by means of the pressure sensor (3).

2. The method of claim 1 comprising the further step of:
determining the difference $\Delta p_2$ between the measured second fluid pressure $p_2$ and a predicted second fluid pressure $<p_2>$ predicted using formula $$<p_2> = (p_1 V_1 + p_0 V_2)/(V_1 + V_2),$$

wherein $V_1$ is the volume of the first fluid storage vessel (17) and wherein $V_2$ is the volume of the second fluid storage vessel (21).

3. The method of claim 2 comprising the further step of:
determining whether the difference $\Delta p_2$ is within a predefined limit $\epsilon$.

4. The method of claim 1, wherein the initial fluid pressure $p_0$ is the atmospheric pressure.

5. The method of claim 1, further comprising the steps of:
providing a third fluid storage vessel (37) being initially at the initial fluid pressure $p_0$;
fluidly connecting the pressure sensor (3), the first fluid storage vessel (17) and/or the second fluid storage vessel (21) to the third fluid storage vessel (37), so that a third fluid pressure $p_3$ is provided at the pressure sensor (3), wherein the third fluid pressure $p_3$ is between the initial fluid pressure $p_0$ and the second fluid pressure $p_2$;
carrying out a pressure measurement of the third fluid pressure $p_3$ at a time $t_3$ by means of the pressure sensor (3).

6. The method of claim 5 comprising the further step of:
determining the difference $\Delta p_3$ between the measured third fluid pressure $p_3$ and a predicted third fluid pressure $<p_3>$ predicted using formula $$<p_3> = (p_2(V_1+V_2) + p_0 V_3)/(V_1+V_2+V_3),$$

wherein $V_3$ is the volume of the third fluid storage vessel (37) and
optionally determining whether the difference $\Delta p_3$ is within a predefined limit $\epsilon$.

7. The method of claim 5, further comprising the steps of:
iteratively performing the following method steps subsequently for all natural numbers n being within the interval $4 \leq n \leq N$ and N being a natural number of maximum iterations:
providing a n-th fluid storage vessel being initially at the initial fluid pressure $p_0$;
fluidly connecting the pressure sensor (3) and the first to n-th fluid storage vessel to the n-th fluid storage vessel, so that a n-th fluid pressure $p_n$ is provided at the pressure sensor (3), wherein the n-th fluid pressure $p_n$ is between the initial fluid pressure $p_0$ and the $(n-1)$-th fluid pressure $p_{(n-1)}$;
carrying out a pressure measurement of the n-th fluid pressure $p_n$ at a time $t_n$ by means of the pressure sensor (3).

8. The method of claim 1, further comprising the steps of:
fluidly disconnecting the pressure sensor (3) and the first fluid storage vessel (17) from the second fluid storage vessel (21);
providing again the initial fluid pressure $p_0$ at the pressure sensor (3) and the first fluid storage vessel (17);
fluidly connecting the second fluid storage vessel (21) with the pressure sensor (3) and the first fluid storage vessel (17), so that a third fluid pressure $p_3$ is provided at the pressure sensor (3), wherein the third fluid pressure $p_3$ is between the initial fluid pressure $p_0$ and the second fluid pressure $p_2$;
carrying out a pressure measurement of the third fluid pressure $p_3$ at a time $t_3$ by means of the pressure sensor (3).

9. The method of claim 1 comprising the further step of:
computing a linear regression of the measured pressure values versus the predicted pressure values in order to determine a calibration function.

10. A test device (1) for automatically carrying out a calibration test on a pressure sensor (3), the test apparatus comprising:
a fluid line (11) which is fluidly connected to the pressure sensor (3) to be tested via a pressure sensor valve;
a first fluid connector (19) configured to fluidly connecting a first fluid storage vessel ( ) to the fluid line (11);
a vessel valve (25) configured to fluidly connect or disconnect the second fluid connector (23) from the pressure sensor (3);
a fluid outlet (9) configured to release fluid from the fluid line (11) via an outlet valve (15);
a fluid inlet (7) configured to fluidly connecting a fluid source to the fluid line (11) via an inlet valve (13);
a control unit (27) configured to perform automatically the following control steps:
closing the inlet valve (13);
opening the vessel valve (25) to fluidly connect the pressure sensor (3) to the second fluid connector (23);
opening the outlet valve (15) to provide atmosphere pressure at the pressure sensor (3), the first fluid connector (19) and the second fluid connector (19);
performing a pressure measurement of the atmosphere pressure as the initial fluid pressure $p_0$ at a time to by means of the pressure sensor (3);

closing the outlet valve (15) and the vessel valve (25);

opening the inlet valve (13) and providing a fluid having a first fluid pressure $p_1$ at the first fluid connector (23) and the pressure sensor (3);

closing the inlet valve (13);

carrying out a pressure measurement of the first fluid pressure $p_1$ at a time $t_1$ by means of the pressure sensor (3);

opening the vessel valve (25) in order to fluidly connecting the second fluid connector (23) with the pressure sensor (3) and the first fluid connector (19), so that a second fluid pressure $p_2$ is provided at the pressure sensor (3);

carrying out a pressure measurement of the second fluid pressure $p_2$ at a time $t_2$ by means of the pressure sensor (3).

11. The test device (1) of claim 10, further comprising:

a first fluid storage vessel (17) fluidly connected to the first fluid connector (19) and/or a second fluid storage vessel (21) fluidly connected to the second fluid connector (23).

12. The test device (1) claim 11, further comprising:

calculation means (29), which are configured to determine the difference $\Delta p_2$ between the measured second fluid pressure $p_2$ and a predicted second fluid pressure $<p_2>$ predicted using the formula $$<p_2>=(p_1 V_1 + p_0 V_2)/(V_1+V_2),$$

wherein $V_1$ is the volume of the first fluid storage vessel (17) and wherein $V_2$ is the volume of the second fluid storage vessel (21).

13. The test device (1) of claim 10, further comprising:

a third fluid connector (35) configured to fluidly connecting a third fluid storage vessel (37) to the fluid line (11); and a second vessel valve (39) configured to fluidly connect or disconnect the third fluid connector with the pressure sensor (3).

14. The test device (1) of claim 10, further comprising:

an information system (41) for retrieving values of the atmospheric pressure at the location of the test device (1) and/or a location determining means (43) for determining the location of the location of the test device (1).

15. A computer program product for a computer-controlled verification or calibration test on a test device (1), wherein the computer program comprises coding segments that when loaded and executed on a suitable system can execute a method for carrying out a calibration test on a pressure sensor (3) according to claim 1.

* * * * *